April 14, 1931. C. M. BRACK Re. 18,039

ROTARY SPIRAL PLOW

Original Filed Nov. 12, 1927 2 Sheets-Sheet 1

INVENTOR.

C. M. Brack,

BY

Geo. P. Kimmel

ATTORNEY.

April 14, 1931. C. M. BRACK Re. 18,039

ROTARY SPIRAL PLOW

Original Filed Nov. 12, 1927 2 Sheets-Sheet 2

INVENTOR.
C. M. Brack,
BY
Geo. P. Kimmel.
ATTORNEY.

Reissued Apr. 14, 1931

Re. 18,039

UNITED STATES PATENT OFFICE

CONRAD M. BRACK, OF GREAT BEND, KANSAS, ASSIGNOR OF FIFTEEN PER CENT TO GEORGE P. KIMMEL, OF WASHINGTON, DISTRICT OF COLUMBIA

ROTARY SPIRAL PLOW

Original No. 1,690,922, dated November 6, 1928, Serial No. 232,887, filed November 12, 1927. Application for reissue filed January 18, 1930. Serial No. 421,822.

This invention relates to a rotary spiral plow and has for its object to provide, in a manner as hereinafter set forth, a plow of such class including a rotatable cylinder having one or more plow elements helically disposed throughout the periphery thereof and with the plow share element constructed in a manner to provide for a thoroughly efficient working or cutting of the ground during the travel of the plow.

A further object of the invention is to provide, in a manner as hereinafter set forth, a rotary plow including one or more helically disposed plow share elements, and further including a combined reciprocatory and oscillatory spring controlled means intermittently engaging with the plow share elements for cleaning them in a satisfactory manner during the travel of the plow.

Further objects of the invention are to provide, in a manner as hereinafter set forth, a rotary plow which is comparatively simple in its construction and arrangement, strong, durable, compact, thoroughly efficient in its use, conveniently assembled, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
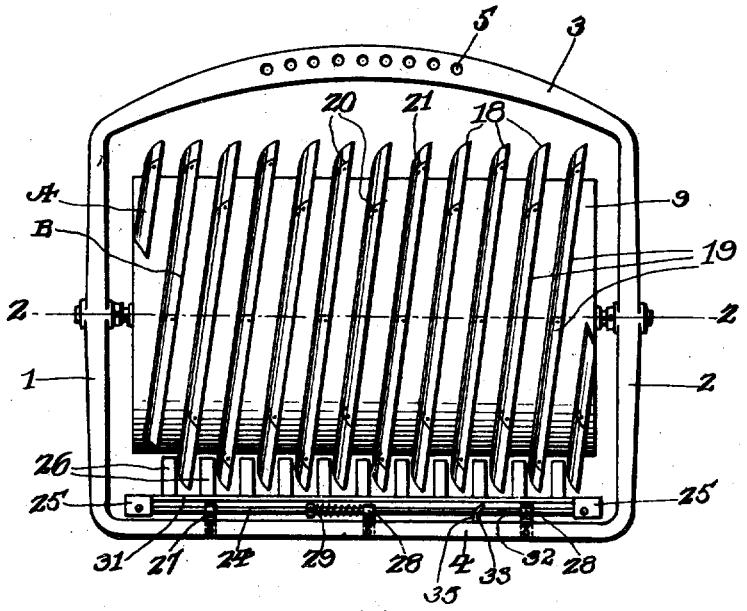
Figure 1 is a top plan view of a rotary plow in accordance with this invention.

A rotary plow, in accordance with this invention, includes a horizontally disposed rectangular frame having the side bars thereof indicated at 1, 2, the front bar at 3 and the rear bar at 4. The front bar 3 projects forwardly and is of arcuate shape. The front bar 3 is provided with a series of spaced openings 5 for adjustably connecting a hitch thereto. Each side bar is provided centrally thereof with an enlarged portion 5′ formed with a central transversely extending opening 6. The enlarged portions 5′ form bearings for a shaft 7, carrying stop collars 8 which are positioned within the frame and arrest lengthwise shifting of the shaft 7, or in other words the collars 8 act to maintain the shaft 7 in set position with respect to the frame.

Bodily carried with the shaft 7 is a rotatable supporting element of appropriate diameter and of a length less than the distance from one side bar to the other side bar of the frame. Preferably the supporting element is in the form of a cylinder or drum which rotates with the shaft 7 and comprises a hollow body portion 9 closed at each end by a flanged head 10.

The flanges of the heads 10 are indicated at 11, and hold-fast devices 12 are employed for securing the heads 10 within the body portion 9 at the ends thereof. Each head 10 is formed with an axial opening 13 for the passage of the shaft 7 and secured to the outer face of each head 10, centrally thereof, is a flanged casting 14. The flange of the casting 14 is indicated at 14′ and it is fixedly secured to a head by the holdfast devices 15. Each casting 14 is formed with an axial opening 16 which registers with an opening 13. The casting is fixedly secured to the shaft 7 by a diametrically extending rivet or pin 17.

Disposed throughout the outer periphery of the body portion 9 is a plow share of left hand helical form preferably consisting of a plurality of helical plow share forming elements, one forming a continuation of the other. Preferably two of such elements are employed and generally indicated at 18. It is to be understood however, that many of such elements can be employed as desired. Each element 18 is formed of a series of helices or share members or sections 19 of like construction.

Figure 2:
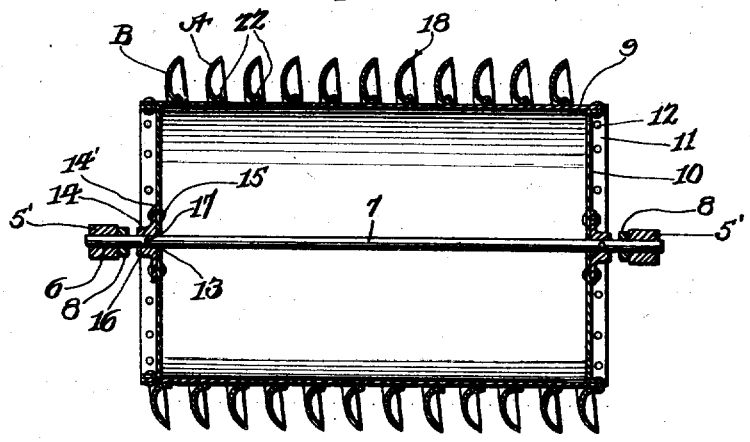
Figure 2 is a longitudinal sectional view of the cylinder carrying the share element.
Figure 3:
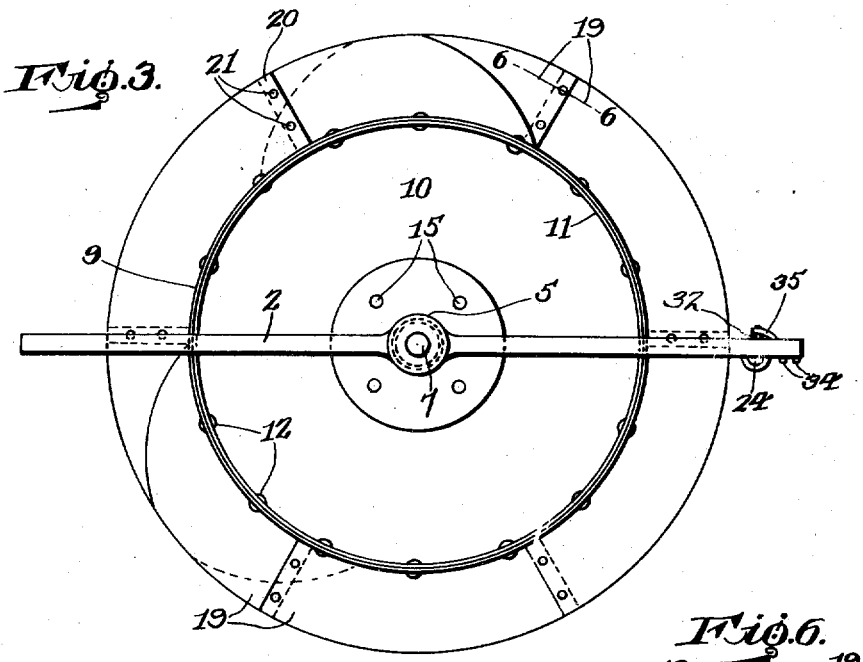
Figure 3 is a side elevation of the plow.
Figure 6:
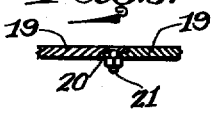
Figure 6 is a fragmentary view, in section, illustrating the lap joint between a pair of plow share members or sections.

The helices or members or sections 19 of each element 18 have a lap joint connection therebetween, as shown in Figure 6. The opposed ends of said members or sections 19 are rabbeted as at 20, arranged in overlapping positions, and detachably connected together by the holdfast devices 21. Each helix or share member or section 19 is of substantially concavo-convex in transverse section with the concave side thereof facing toward the right hand side of the plow. See Figure 2. Each share member or section 19 has the inner side of each helix thereof seated directly against the outer periphery of the cylinder, by the holdfast devices 22.

In vertical section, at any point throughout the length of a share forming element, the outer edge of the latter is arranged out of alinement with respect to the inner edge thereof. Each helix includes an outer and an inner portion and with the former upon a greater arc than that of the latter.

Figure 4:
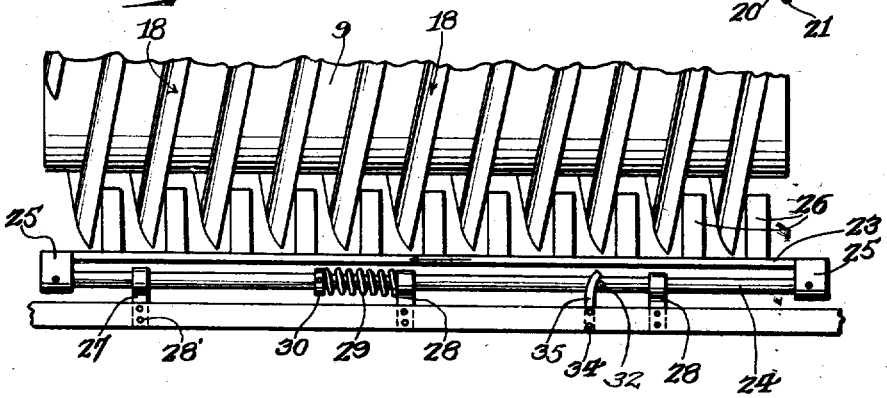
Figure 4 is a fragmentary view in plan and upon an enlarged scale showing the arrangement of the cleaner device with respect to the share elements.
Figure 5:
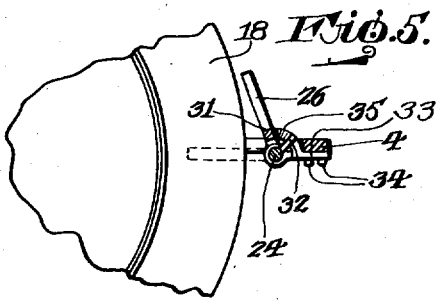
Figure 5 is a sectional detail looking towards the right side of the cam piece for elevating the cleaning members and further showing a cleaning member in full line elevated and in dotted lines opposing one side of a helix to be shifted by the plow share.

Carried by the rear bar 4 of the frame and projecting forwardly therefrom is a combined reciprocatory and oscillatory spring controlled means which is adapted to intermittently engage with the plow share element or elements for cleaning it or them in a satisfactory manner during the travel of the plow. The said cleaning means comprises a pair of spaced, parallel bars 23, 24 and with the former arranged forwardly of the latter. The bars 23, 24 are connected together at their ends by the coupling devices 25. The bar 24 is arranged forwardly of the rear bar 4 of the frame, arranged in parallelism with respect thereto, and spaced therefrom. The bar 23 is of square cross section and the bar 24 of cylindrical cross section. Secured to and extended forwardly from the bar 23 is a series of spaced cleaner members 26 for bearing against the plow share element or elements. The bar 24 is slidably supported by a series of apertured, forwardly directed supporting members 27 arranged in spaced relation, and fixedly secured to the rear bar 4 of the frame, by the holdfast devices 28. The number of supporting members is three and carried by the bar 24 and bearing against the central supporting member 28 is a coiled controlling spring 29, confined on the bar 24 between a collar 30 and said central supporting member. The spring 29 functions to maintain the bars 23, 24 and cleaner members 26 in the position shown in Figure 1. The bars 23, 24 are shifted in the direction of the arrow Figure 4, against the action of the controlling spring 29, by the coils of the plow share element or elements. The bar 24 is provided with a stud 32, which rides against a cam piece 33 extending forwardly from the rear bar 4 of the frame. The cam piece 33 is secured to the rear bar 4 by the holdfast devices 34. The cam piece 33 includes an upstanding arcuate part 35 arranged forwardly of the bar 4 and provides in connection with stud 32 for moving the bars 23, 24 in an upward direction to elevate the members 26 to clear the helices of the plow share elements or element. This action is had by the riding of stud 32 against part 35 when the coils of the share element act to shift bars 23, 24 in the direction of the arrow. After the cleaning members are elevated, the spring 29 act to move the bars 23, 24 in the opposite direction and the cleaning members lower to normal position by gravity. The reciprocation movement of the cleaning means is had through the medium of spring 29 and helices of the plow share element or elements, and the oscillatory movement of the cleaning means is had through the medium of the stud 32, cam 33 and spring 29. The movement of the cleaning means in one direction, during its oscillatory movement, is caused by the stud 32 and cam piece 33 and the movement in the opposite direction is had by gravity. The construction and arrangement of the cleaning devices provides for the intermittent engagement thereof with the coils of the plow share element or elements.

By way of example, it will be assumed that the helices of the plow share element or elements are spaced eight inches apart than the movement of the cleaning means to the left would be ten inches and to the right ten inches. The extent of movement of the cleaning means will depend upon the distance the helices are spaced from each other.

In Figure 1, one of the plow share elements is indicated at A and the other at B, and which coact to provide the plow share of left hand helical form, having the concave face thereof opening toward the right side of the plow. The construction and arrangement of the plow share will provide when the latter is active, for the avoiding of side draft and friction incidental to the cutting and turning of the soil. The rotatable supporting element is disposed at right angles to the line of draft and rotates during the travel of the plow to provide for the share of helical form to cut and turn the soil. The periphery of the rotatable supporting element may be provided with one or more plow shares of the left hand helical type, but if two or more are employed, the inclination of the helicals will be less than that if but one is used.

The cleaning members 26 operate in the grooves formed between the coils of, and are not in permanent engagement with the plow share elements, but are shifted to intermittently engage therewith for the purpose of cleaning the same.

It is thought the many advantages of a rotary plow, in accordance with this invention can be readily understood, and although the preferred embodiment of the invention is as illustrated and described, yet it is to be understood that changes in the details of construction can be had which will fall within the scope of the invention as claimed.

What I claim is:

1. A rotary plow comprising a rotatable cylinder provided on its periphery with spaced helically arranged plow share sections, and a combined reciprocatory and oscillatory cleaning means intermittently engaging with said sections during the rotation of the cylinder.

2. A rotary plow comprising a rotatable cylinder provided on its periphery with helically arranged plow share sections of concavo-convex cross section arranged in spaced relation, and a combined reciprocatory and oscillatory cleaning means intermittently positioned between and engaging with said sections for cleaning the same during the rotation of the cylinder.

3. A rotary plow comprising a frame, a rotatable cylinder carried thereby and provided on its periphery with helically arranged plow share sections of concavo-convex cross section, and a combined reciprocatory and oscillatory cleaning means carried by the rear bar of said frame and intermittently extending between said sections for cleaning the latter during the rotation of the cylinder.

4. A rotary plow comprising a frame, a rotatable cylinder carried thereby and arranged therein, helically arranged plow share sections secured to the periphery of said cylinder, of concavo-convex cross section and arranged in spaced relation, and a combined reciprocatory and oscillatory cleaning means carried by the rear bar of said frame and intermittently extending between said sections and cleaning the same during the rotation of the cylinder.

5. A rotary plow comprising a rotatable supporting element having from end to end thereof and upon its periphery, helically protruding means of concavo-convex cross section providing a plow share, and a spring controlled, cam shiftable, bodily movable set of cleaner members intermittently engaging with the helices of said means during the rotation of said element.

6. A rotary plow comprising a rotatable supporting element having from end to end thereof and upon its periphery, helically protruding means of concavo-convex cross section providing a plow share, said share having the concave face thereof facing to the right side of the plow, and a combined reciprocatory and oscillatory cleaning structure intermittently engaging with the helices of said means during the rotation of said element.

7. A rotary plow including a rotatable cylinder provided on its periphery with a plow share of left hand helical form and concavo-convex in cross section, the concave side of said share facing to the right side of the plow, and a spring controlled, cam shiftable bodily movable cleaning structure intermittently engaging with the helices of the plow share during the rotation of said cylinder.

8. A rotary plow including a central, rotatable supporting member having positioned thereon a helical plow share having the helices thereof of concavo-convex cross section, and cleaning means intermittently engaging with the helices of said share during the rotation of said member, the inner side of said helices being secured to the periphery of said element.

9. A rotary plow including a central, rotatable supporting member having positioned lengthwise thereon a helical plow share having its helices of concavo-convex cross section, the inner sides of said helices being secured to the periphery of said element and the outer sides provided with a cutting edge, and a spring controlled, cam shiftable, bodily movable set of cleaner members intermittently engaging with the helices of said share during the rotation of said supporting member.

10. A plow including a frame, a central, rotatable supporting member carried by the frame and having positioned thereon lengthwise thereof a plow share comprising a helically arranged element having the helices thereof providing blades of concavo-convex cross section with the concave side thereof facing toward the right hand side of, and a cleaning structure intermittently engaging with said blades.

11. A rotary plow comprising a rotatable supporting element having from end to end thereof and upon its periphery, helically protruding means having its helices of concavo-convex cross section and providing a plow share, said element being rotatable during the engagement of the plow share with the ground on the travel of the plow, means for rotatably supporting said element, and a bodily shiftable cleaning structure carried by said means and intermittently engaging with said helices.

12. A rotary plow including a rotatable cylinder provided on its periphery with a plow share of left hand helical form and having the helices thereof concavo-convex in cross section, the concave side of each helix facing to the right side of the plow, said cylinder being disposed at right angles to the line of draft and rotatable during the engagement of the plow share with the ground on the travel of the plow, a supporting means carrying a rotatable element for said cylinder, and a spring controlled, cam shiftable, bodily movable set of cleaner members carried by said means and intermittently engaging with said helices.

13. A rotary plow comprising a rotatable supporting element having from end to end thereof and upon its lengthwise outer face, helically protruding means having the helices thereof spaced from each other, of concavo-convex cross section and providing a plow share, the inner sides of said helices seated upon and secured to said outer face, a spring controlled, cam shiftable, bodily movable set of cleaner members intermittently engaging with said helices.

14. A rotary plow comprising a rotatable supporting element having from end to end thereof and upon its lengthwise outer face, helically protruding means having the helices thereof spaced from each other, of concavo-convex cross section and providing a plow share, the inner sides of said helices seated upon and secured to said outer face, a spring controlled, cam shiftable, bodily movable set of cleaner members intermittently engaging with said helices, and said helices having the concave faces thereof facing towards the right end of said element.

15. A rotary plow comprising a rotatable supporting element having from end to end thereof and upon its lengthwise outer face, helically protruding means having the helices thereof spaced from each other, of concavo-convex cross section and providing a plow share, the inner sides of said helices seated upon and secured to said outer face, a spring controlled, cam shiftable, bodily movable set of cleaner members intermittently engaging with said helices, and each of said helices in vertical section having its outer edge arranged out of alinement with respect to its inner edge and having its outer portion upon a greater arc than the arc of its inner portion.

16. A rotary plow comprising a rotatable supporting element having from end to end thereof and upon its lengthwise outer face, helically protruding means having the helices thereof spaced from each other, of concavo-convex cross section and providing a plow share, the inner sides of said helices seated upon and secured to said outer face, a spring controlled, cam shiftable, bodily movable set of cleaner members intermittently engaging with said helices, said helices having the concave faces thereof facing towards the right end of said element, and each of said helices in vertical section having its outer edge arranged out of alinement with respect to its inner edge and having its outer portion upon a greater arc than the arc of its inner portion.

17. A rotary plow comprising a rotatable supporting element having from end to end thereof and upon its lengthwise outer face, helically protruding means having the helices thereof spaced from each other, of concavo-convex cross section and providing a plow share, the inner sides of said helices seated upon and secured to said outer face, a spring controlled, cam shiftable, bodily movable set of cleaner members intermittently engaging with said helices, and each helix having an outer and an inner portion and with the former upon a greater arc than the arc of the latter.

18. A rotary plow comprising a rotatable supporting element having from end to end thereof and upon its lengthwise outer face, helically protruding means having the helices thereof spaced from each other, of concavo-convex cross section and providing a plow share, the inner sides of said helices seated upon and secured to said outer face, a spring controlled, cam shiftable, bodily movable set of cleaner members intermittently engaging with said helices, said helices having the concave faces thereof facing towards the right end of said element, and each helix having an outer and an inner portion and with the former upon a greater arc than the arc of the latter.

19. A rotary plow comprising a rotatable supporting element of circular cross section, a frame, a rotatable shaft carried by the frame and fixed to said element, helically protruding means extending circumferentially and lengthwise and having the inner marginal portion of one face thereof seating against the outer periphery of said element, said element arranged within said frame, and a bodily shiftable set of cleaner members carried by the frame and intermittently engaging with the helices of said means during the rotation of said element.

20. A rotary plow comprising a rotatable supporting element of circular cross section, a frame, a rotatable shaft carried by the frame and fixed to said element, helically protruding means extending circumferentially and lengthwise and having the inner marginal portion of one face thereof seating against the outer periphery of said element, said element arranged within said frame, and a spring controlled, cam shiftable, bodily movable set of cleaner members carried by the frame and intermittently engaging with the helices of said means.

21. A rotary plow comprising a rotatable supporting element of circular cross section, a frame, a rotatable shaft carried by the frame and fixed to said element, helically protruding means extending circumferentially and lengthwise and having the inner marginal portion of one face thereof seating against the outer periphery of said element, said element arranged within said frame, and a combined reciprocatory and oscillatory cleaning means carried by the frame and intermittently positioned between and engaging with the helices of said means during the rotation of said element.

In testimony whereof, I affix my signature hereto.

CONRAD M. BRACK.